US012230115B2

(12) United States Patent
Younge

(10) Patent No.: US 12,230,115 B2
(45) Date of Patent: Feb. 18, 2025

(54) PERSONAL-ASSISTANCE SYSTEM FOR THREAT DETECTION AND CONVENIENCE

(71) Applicant: T-Mobile USA, Inc., Bellevue, WA (US)

(72) Inventor: Mark Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 136 days.

(21) Appl. No.: 18/065,573

(22) Filed: Dec. 13, 2022

(65) Prior Publication Data
US 2024/0194046 A1 Jun. 13, 2024

(51) Int. Cl.
| | |
|---|---|
| *G08B 21/04* | (2006.01) |
| *G06F 3/01* | (2006.01) |
| *G06F 3/16* | (2006.01) |
| *G08B 31/00* | (2006.01) |
| *G16Y 20/40* | (2020.01) |
| *H04W 76/10* | (2018.01) |
| *H04W 84/18* | (2009.01) |

(52) U.S. Cl.
CPC .......... *G08B 21/0453* (2013.01); *G06F 3/011* (2013.01); *G06F 3/167* (2013.01); *G08B 31/00* (2013.01); *G16Y 20/40* (2020.01); *H04W 76/10* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 6,819,247 B2 | 11/2004 | Birnbach et al. |
| 8,319,833 B2 | 11/2012 | Weinstein et al. |
| 9,153,074 B2 | 10/2015 | Zhou et al. |
| 9,615,235 B2 | 4/2017 | Scully et al. |
| 9,697,721 B1 | 7/2017 | Akuoku |
| 9,715,805 B1 | 7/2017 | Scully et al. |
| 9,811,818 B1 | 11/2017 | Xing |
| 9,922,236 B2 | 3/2018 | Moore et al. |
| 9,953,511 B2 | 4/2018 | Eskildsen et al. |

(Continued)

FOREIGN PATENT DOCUMENTS

| | | |
|---|---|---|
| EP | 2903703 A1 | 8/2015 |
| WO | 2015143085 A1 | 9/2015 |

(Continued)

*Primary Examiner* — Thomas S McCormack
(74) *Attorney, Agent, or Firm* — Perkins Coie LLP

(57) ABSTRACT

A user-assistant system for threat detection and convenience is disclosed. The system includes a primary device (e.g., handheld mobile device) configured to establish a local network with one or more secondary devices (e.g., wearable device). The primary device can couple the system to a wireless communications network. A first sensor monitors physical activity occurring within a threshold vicinity of a user, and a second sensor can measure a physical property of the user. The system can determine that the physical activity satisfies the first condition and that the measure of the physical property satisfies a second condition within a timeframe of the first condition being satisfied. In response to the first and second conditions being satisfied within the timeframe, the system performs an action configured to assist the user in real-time to interpret and respond to the physical activity in a real-world environment.

19 Claims, 4 Drawing Sheets

(56) References Cited

U.S. PATENT DOCUMENTS

| | | |
|---|---|---|
| 10,250,624 B2 | 4/2019 | Mixer et al. |
| 10,383,786 B2 | 8/2019 | Pikle et al. |
| 10,446,017 B1 | 10/2019 | Gershoni et al. |
| 10,447,966 B2 | 10/2019 | Ritchey et al. |
| 10,540,704 B2 | 1/2020 | Mazed et al. |
| 10,896,545 B1 | 1/2021 | Kin et al. |
| 11,262,841 B2 | 3/2022 | Davis et al. |
| 11,287,847 B2 | 3/2022 | Ritchey et al. |
| 11,328,582 B1 | 5/2022 | Younge |
| 2006/0190419 A1 | 8/2006 | Bunn et al. |
| 2008/0129518 A1 | 6/2008 | Carlton-Foss |
| 2008/0188310 A1 | 8/2008 | Murdock |
| 2014/0375470 A1 | 12/2014 | Malveaux |
| 2017/0064073 A1 | 3/2017 | Spencer et al. |
| 2017/0103440 A1 | 4/2017 | Xing et al. |
| 2017/0231528 A1 | 8/2017 | Nathan |
| 2018/0301211 A1 | 10/2018 | Pappas et al. |
| 2019/0065970 A1 | 2/2019 | Bonutti et al. |
| 2019/0173909 A1 | 6/2019 | Mixer et al. |
| 2019/0369641 A1 | 12/2019 | Gillett |
| 2020/0005385 A1 | 1/2020 | Stout et al. |
| 2020/0064444 A1 | 2/2020 | Regani et al. |
| 2020/0342548 A1 | 10/2020 | Mazed et al. |
| 2021/0105435 A1 | 4/2021 | Ritchey et al. |
| 2021/0275023 A1 | 9/2021 | Kalantarian et al. |
| 2022/0116736 A1 | 4/2022 | Williams et al. |
| 2022/0225101 A1 | 7/2022 | Fellows |
| 2022/0273139 A1 | 9/2022 | Mahapatra et al. |
| 2022/0292543 A1 | 9/2022 | Henderson |
| 2022/0310094 A1 | 9/2022 | Nguyen et al. |
| 2022/0330833 A1* | 10/2022 | Levinson .................. A61B 5/01 |

FOREIGN PATENT DOCUMENTS

| | | |
|---|---|---|
| WO | 2016097998 A1 | 6/2016 |
| WO | 2016167877 A1 | 10/2016 |
| WO | 2017196162 A2 | 11/2017 |
| WO | 2018122709 A1 | 7/2018 |
| WO | 2018152365 A1 | 8/2018 |
| WO | 2018215827 A1 | 11/2018 |
| WO | 2020146766 A1 | 7/2020 |

* cited by examiner

PERSONAL-ASSISTANCE SYSTEM FOR THREAT DETECTION AND CONVENIENCE

BACKGROUND

Internet of things (IOT) devices are individually addressable and can include sensors, processing ability, software and other technologies that connect and exchange data with other devices and systems over the Internet or other communications networks. There are different types of IoT devices and applications. Examples include consumer IoT devices and applications that are primarily for everyday use, such as home appliances, voice assistance, and light fixtures. Commercial IoT devices are primarily used in the healthcare and transport industries (e.g., smart pacemakers, monitoring systems). Military Things (IoMT) devices are primarily used for the application of IoT technologies in the military field (e.g., surveillance robots, human-wearable biometrics for combat). Industrial Internet of Things (IIoT) devices are primarily used with industrial applications, such as in the manufacturing and energy sectors (e.g., digital control systems, smart agriculture, industrial big data). Infrastructure IoT devices are primarily used for connectivity in smart cities (e.g., infrastructure sensors, management systems).

IoT devices can include wearable technology is designed to be used while worn by a user. Types of wearable technologies include smartwatches and smart glasses. Wearable electronic devices are often close to or on the surface of the skin, where they detect, analyze, and transmit information such as vital signs, and/or ambient data and which allow biofeedback to the wearer. Wearable devices such as activity trackers are an example of an IoT device, since "things" such as electronics, software, sensors, and connectivity are effectors that enable objects to exchange data. Wearables are popular in consumer electronics, most commonly in the form factors of smart watches, smart rings, and implants. Apart from commercial uses, wearable technology is being incorporated into navigation systems, advanced textiles, and healthcare.

BRIEF DESCRIPTION OF THE DRAWINGS

Detailed descriptions of implementations of the present invention will be described and explained through the use of the accompanying drawings.

Figure 1:
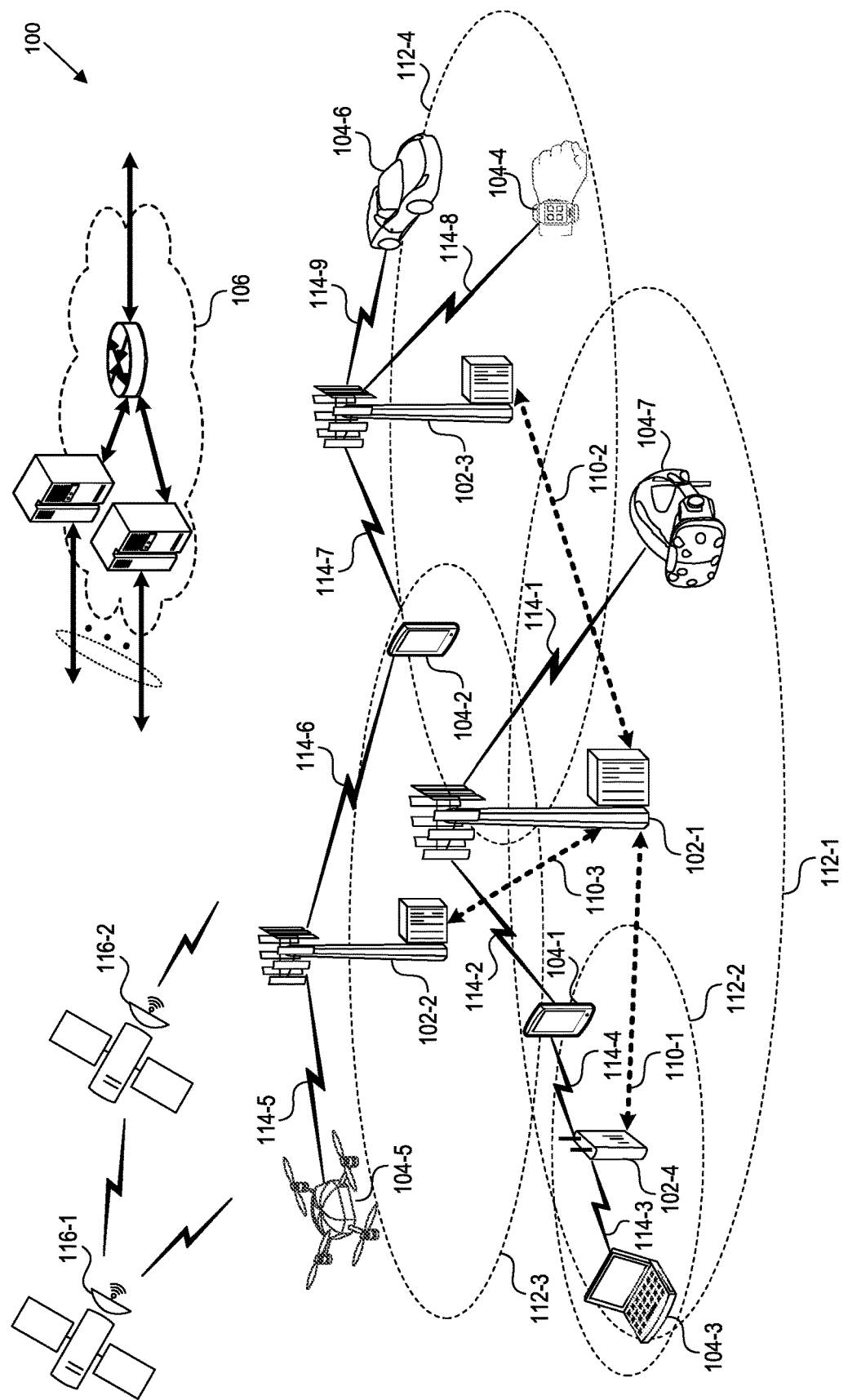
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A personal-assistance system includes a combination of electronic devices that are networked to provide personal threat detection and convenience features to a user. An example of the electronic devices includes an Internet-of-Things (IoT) device such as a wearable device that can connect to a communications network (e.g., a telecommunications network) to provide the threat detection and/or assist users who are impaired or disabled. The IoT device includes sensors that can detect objects or properties of a user's environment and provide feedback to aid a disabled user. In one example, the personal-assistance system includes a wearer with sensors, transducers, and a display that can survey a wearer's immediate environment (e.g., within a threshold distance from the user). The personal-assistance system can enhance, interpret, and/or translate sounds or images for presenting to the wearer of the IoT device and/or to notify a public safety agent, or an entity who is not in the user's immediate environment. As such, the disclosed technology can mitigate the risk of threats from crime, which is on the rise and from which people seek safety or feel threatened. Vision and hearing-impaired people are particularly vulnerable to their surroundings and need assistance to navigate a world that is designed for abled-bodied people.

The personal-assistance system can include a device that is integrated into clothing and/or accessories including but not limited to a shoe, belt buckle, jewelry, eyewear, earwear, hat, or the like. The device can include a body camera that is activated by the wearer to stream situational sound and images in real-time to public safety for a response and subsequent investigation of a detected or reported event. In one example, the personal-assistance system incorporates imaging technologies such as LiDAR, which enables the system to alert the wearer of potential hazards such as an approaching person or vehicle outside of the wearer's field of vision or awareness. For vision impaired wearers, the system could enhance, interpret, and/or translate images to a form that the impaired wearer can understand. In another example, the processed images can be transmitted to a guide (other than the user) to help them navigate environments. Similarly, for hearing impaired wearers, the system can enhance, interpret, and/or translate sounds for the wearer. The system could also interpolate with biometric sensors to assess a wearer's vital signs and initiate a medical alert, if appropriate. The system can also provide convenience features such as, for example, translating visual information or speech from one language to another that the wearer can comprehend, or in a local language.

Implementations of the technology can utilize artificial intelligence or machine learning (AI/ML) technologies that are trained to improve performance of the system with more situational data of the same user and/or other users. The AI/ML features can be activated by the wearer with voice commands or automatically in response to threat detection to improve the detection of threats and how to compensate for a user's state. Another implementation can include augmented reality (AR) technologies that augment the information that is fed to the user after being processed by the system, such that the information includes features that enhance comprehension and reduce the cognitive burden on the user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). An implementation of the network 100 can support terahertz (THz) communications. This can support wireless applications that demand ultra-high quality of service requirements and multi-terabits per second data transmission in the current generation and beyond era, such as terabit-per-second backhaul systems, ultrahigh-definition content streaming among mobile devices, AR/VR, and wireless high-bandwidth secure communications. In another example, the network 100 can implement a converged Radio Access Network (RAN) and Core architecture to achieve Control and User Plane Separation (CUPS) and achieve extremely low User Plane latency. In yet another example, the network 100 can implement a converged Wi-Fi and Core architecture to increase and improve indoor coverage.

Personal-Assistance System

Figure 2:
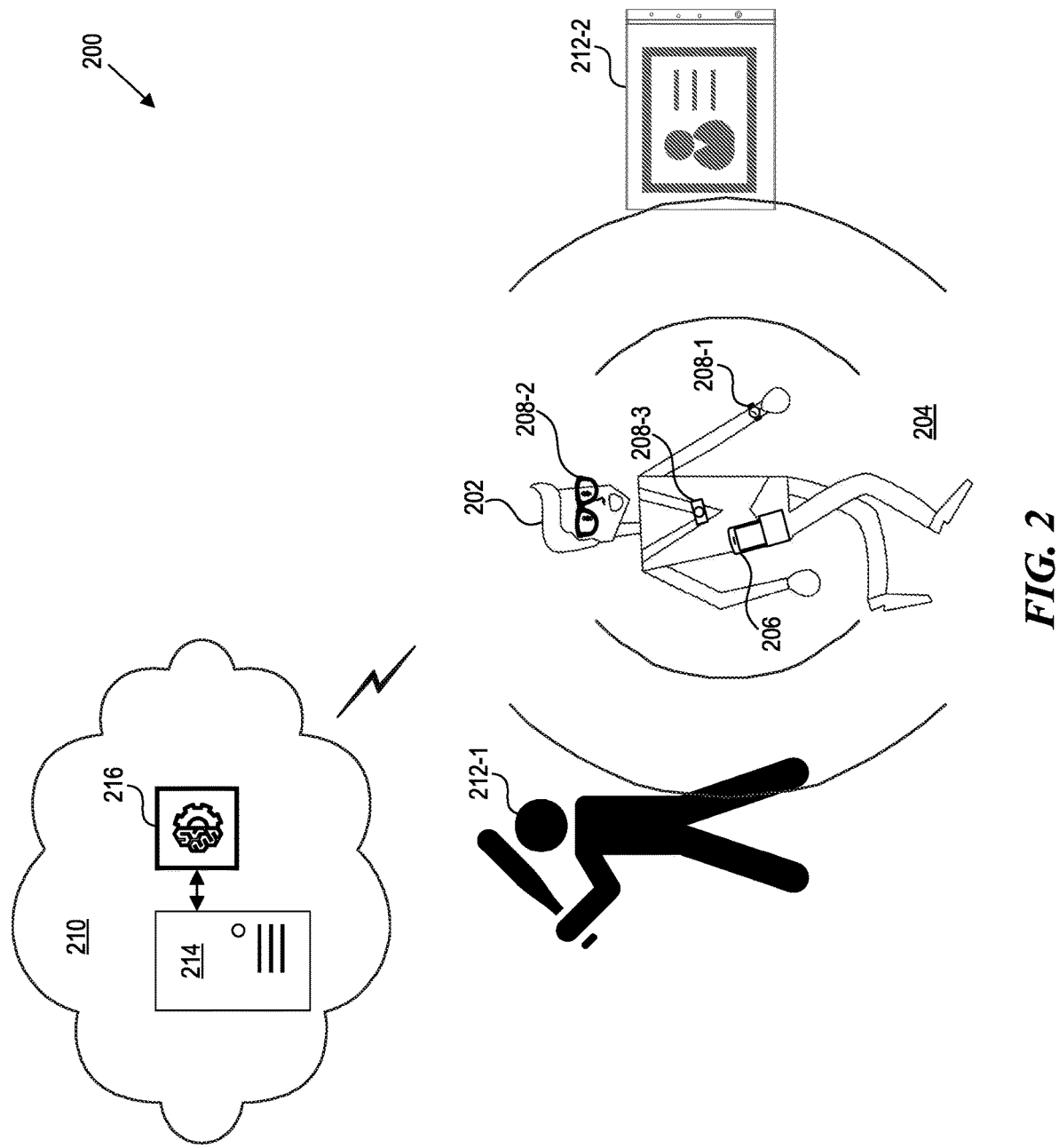
FIG. 2 is a block diagram that illustrates a personal-assistance system for threat detection and convenience.

FIG. 2 is a block diagram that illustrates a personal-assistance system ("system") for threat detection and convenience. The system 200 includes a network of electronic components that can assist the user 202 in real-time to interpret and respond to physical activities in a real-world environment 204. As used herein, "real-time" and "near real-time" are used synonymously to refer to what a human perceives as occurring virtually immediately. The system 200 includes a primary device 206 that is configured to establish a local network with one or more secondary devices 208-1, 208-2, and 208-3 (referred to herein collectively as "secondary devices 208" and individually as "secondary device 208"). Examples of the primary device 206 include a smartphone, a tablet computer, or another device that can directly connect to the network 210. Examples of the secondary devices 208 include an IOT device, smartphone, tablet computer, wearable device, or smart-home device.

The primary device 206 is configured to couple the secondary devices 202-2 through 202-6 to a wireless communications network such as a telecommunications network. Hence, the primary device 206 can be configured to function as a network access device for any secondary device 208. In one example, the primary device 206 includes a handheld mobile device that can connect to a network 210 through a network access node (not shown). The primary device 206 can include a long-range wireless radio and a short-range wireless radio. The long-range wireless radio is used to couple the system to a wireless communications network, and the short-range wireless radio is used to couple the secondary devices 208 to the wireless communications network through the primary device 206. In one example, the secondary devices 208 include at least one wearable device worn by the user 202. The illustrated examples of the secondary devices 208 include a smart watch 208-1, smart glasses 208-2, and a IOT device 208-3.

At least one of the primary devices 206 and/or the secondary devices 208 can operate as a controller device that includes a hardware processor and a non-transitory memory storing instructions, which, when executed by the at least one hardware processor, cause the system 200 to process sensor data or signals to manage outputs that assist the user with risks and to provide convenience features.

In one example, the system 200 includes multiple sensors configured to detect physical activities in a threshold vicinity of the user 202 and determine whether the user 202 needs or could benefit from assistance. The threshold vicinity can be arbitrarily preset for the user based on a level of comfort, particular need or disability, or the reach or limitation of the technology used for monitoring a vicinity. In one example, the system 200 includes a first sensor configured to monitor physical activity occurring in a threshold vicinity of a user and a second sensor configured to measure a physical property of the user. The sensors can be disposed at any combination of the primary device 206, the secondary devices 208, and/or devices at the network 210 including the server 214 coupled to the AI/ML engine 216.

In one example, the primary device 208 can receive signals (e.g., sensor data) from sensors disposed thereon and/or at the secondary devices 208 to determine that the physical activity satisfies the first condition. The primary device 208 can also determine that the measure of the physical property of the user 202 satisfies a second condition within a timeframe of the first condition occurring or being satisfied. The timeframe can be set or determined to optimize for predicting a risk or need/benefit of providing personal assistance. For example, rapid eye movement detected within seconds after a user is exposed to a device that renders a visualization or after a person is within the vicinity of the user and speaks, can trigger a prediction for assistance. In some implementations, the timeframe, first condition, or second condition, can be determined based on an output of the AI/ML engine 216 that is trained based on values obtained from multiple users of respective systems including respective primary devices communicatively coupled to groups of secondary devices.

In an implementation, the first sensor is disposed in a secondary device 208 that is configured to determine a distance between the user 202 and an object 212 in the threshold vicinity of the user 202. The first condition can correspond to a threshold distance between the user 202 and the object 212. The second sensor can be disposed in a secondary device 208 configured to predict awareness of the user that the object 212 is in the threshold vicinity. As such, the measure of the physical property of the user 202 can include a pulse rate, heart activity, eye movement, physical movement, or speech of the user 202 as detected with a biological or physiological sensor in contact with the user 202.

The system 200 provides personal assistance when sensor data indicates that the user 202 is unaware of certain physical activity or the physical activity presents a need or benefit of assistance by the user 202 to understand how to respond. For example, in response to the first condition and the second condition being satisfied within the timeframe, the system 200 is caused to perform an action configured to assist the user 202 in real-time to interpret and respond to the physical activity in a real-world environment 204. These functions can be performed by any combination of the primary device 206, secondary devices 208, and/or the server 214 located at the network 210, which can provide feedback to the primary device 206.

In one example, the system 200 can analyze the physical activity in the threshold vicinity of the user, detect that the first condition is satisfied based on the analysis of the physical activity, and report the detection of the first condition to a controller device (e.g., the primary device 206). The first condition is indicative of anomalous activity. In another example, the primary device 206 can receive a first signal indicating that a physical activity satisfied the first condition; however, a second signal can indicate that the second condition is not satisfied by the measure of the physical property of the user. As such, the system 200 will not respond to assist the user in real-time to interpret and respond to the physical activity in the real-world environment 204. That is, despite physical activity being detected within a threshold vicinity of the user 202, the sensor data indicates that the user is aware of the physical activity or does not need or will not benefit from assistance to interpret or respond to the physical activity. Accordingly, the system 200 is allowed to perform the action only when the measure of the physical property satisfies the second condition within a timeframe of when the first condition occurred or was satisfied.

In an implementation as a threat detection system, the system 200 can detect presence of an object such as a person 212-1 within the threshold vicinity of the user 202. Examples of the first sensor include a hazard detection sensor such as a distance sensor, a motion sensor, an audio sensor, or a signal strength sensor. The distance sensor is configured to determine a distance to the object 212 relative to the user 202. The motion sensor is configured to detect motion of the object 212 relative to the user 202 or motion of the user 202. The audio sensor is configured to detect sound or speech classified as hazardous. The signal strength sensor is configured to detect a signal strength of an electronic device. In another example, a location-based sensor can detect whether another person co-located with the user 202, based on the other person's location data.

The controller device (e.g., primary device 206) is configured to cause the system 200 to perform an action in response to an object being detected within the threshold vicinity of the user and a prediction that the user is unaware that the object is within the threshold vicinity of the user. The action can include communicating a notification to the user or an entity other than the user about a potential threat caused by presence of the object within the threshold vicinity of the user. For example, a first sensor can detect presence of a person within the threshold vicinity of the user based on, for example, signals detected of an electronic device associated with the person or based on an imaging of the threshold vicinity of the user. The second sensor is configured to predict whether the user is expecting to meet a person within the threshold vicinity based on a schedule or historic behavior of the user or based on a measure of a physiological property of the user. As such, the physical activity corresponds to the presence of the person within the threshold vicinity of the user.

The system 200 also determines an indication of the user 202's awareness that the object is within the threshold vicinity of the user. The measure of the physical property of the user 202 can correspond to a measure of a movement or physiological property of the user 202. As such, the system 200 can cause the primary device 206 to generate an alert for the user 202 indicating presence of the object within the threshold vicinity of the user 202. An action performed by the primary device 206 can include communicating the alert to the user 202. For example, the alert can indicate that presence of the object poses a risk of a threat to the user 202.

In an implementation as a convenience system, the system 200 can detect audio or visual activity associated with an object 212-2 located within the threshold vicinity of the user 202. For example, the detected activity can include images shown on a device such as a kiosk or speech uttered by a person. In the example, the physical activity corresponds to the audio or visual activity associated with the object 212-2. The system 200 can detect that the audio or visual activity is at least partially incomprehensible by the user. In particular, the measure of the physical property can correspond to a measure of a physical movement or physiological property of the user (e.g., elevated heart rate or using a smartphone to lookup information). The system 200 can generate an audio element, a tactile element, or a visual element configured to aid the user in comprehension of the audio or visual activity. As such, the action performed by the system 200 includes presenting the audio element or the visual element to the user 202 on an electronic device such as the primary device 206.

For example, the system 200 can include a sensor configured to detect human-perceptible information from a third-party object (e.g., object 212-2) within a threshold vicinity of the user 202. The AI/ML engine 216 can predict whether the user needs assistance to interpret the human-perceptible information of the object. The controller can create new human-perceptible information based on the original human-perceptible information. The new human-perceptible information is configured to assist the user 202 to interpret the original human-perceptible information. The system 200 is caused to present the new human-perceptible information to the user 202. The new human-perceptible information is presented in real-time or near-real-time of detecting the original human-perceptible information.

In one example, the human-perceptible information includes a visualization, and the system 200 creates a visual element that is incorporated into the original visualization to generate an augmented-reality (AR) experience that assists the user 202 to interpret the original visualization. In another example, the human-perceptible information includes speech in a first language, and the system 200 translates the speech in a second language different from the first language, to assist the user 202 understand the original speech.

The AI/ML engine 216 include one or more ML models (e.g., ML algorithms). A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of a certain/specific n-gram occurring in a given language based on an analysis of a large corpus from that language. Examples of ML models/algorithms include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, an ML model can be a neural network with multiple input nodes that receive inputs indicative of awareness of a user or a need for assistance in the presence of an object in the threshold vicinity of a user. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used as to predict the awareness, or need of a user based on physical or physiological sensor data of the user. In some implementations, neural networks known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

An ML model can be trained with supervised learning, where the training data includes awareness data of groups of users as input and a desired output, such as an indication that a user lacks awareness, or needs/benefits assistance. A representation of awareness or need/benefit can be provided to the model. Output from the model can be compared to the desired output for that user and, based on the comparison, the model can be modified, such as by changing weights between nodes of the neural network or parameters of the functions used at each node in the neural network (e.g., applying a loss function). After applying each of the inputs in the training data and modifying the model in this manner, the model can be trained to evaluate new sensor data of a physical property of a user.

In one example, the ML engine 216 can predict whether the user needs assistance to interpret the human-perceptible information based on data included in a profile of the user 202, historical information of activities of multiple users of respective personal assistance systems, or content of the human-perceptible information. In one example, the system 200 includes a local model that can be updated based on a global model. The global model reflects training data of multiple users, whereas the local model reflects training data of the user 202. As such, the combination of the local and global model can provide both personalized responses, and responses based on a broader scope of data. In one example, the local model located at the primary device 206 or a secondary device 208 is updated based on a global model stored at the server 214, which is accessible via the network 210. The global model is trained based on respective systems including primary devices coupled to secondary devices configured to assist multiple users.

Figure 3:
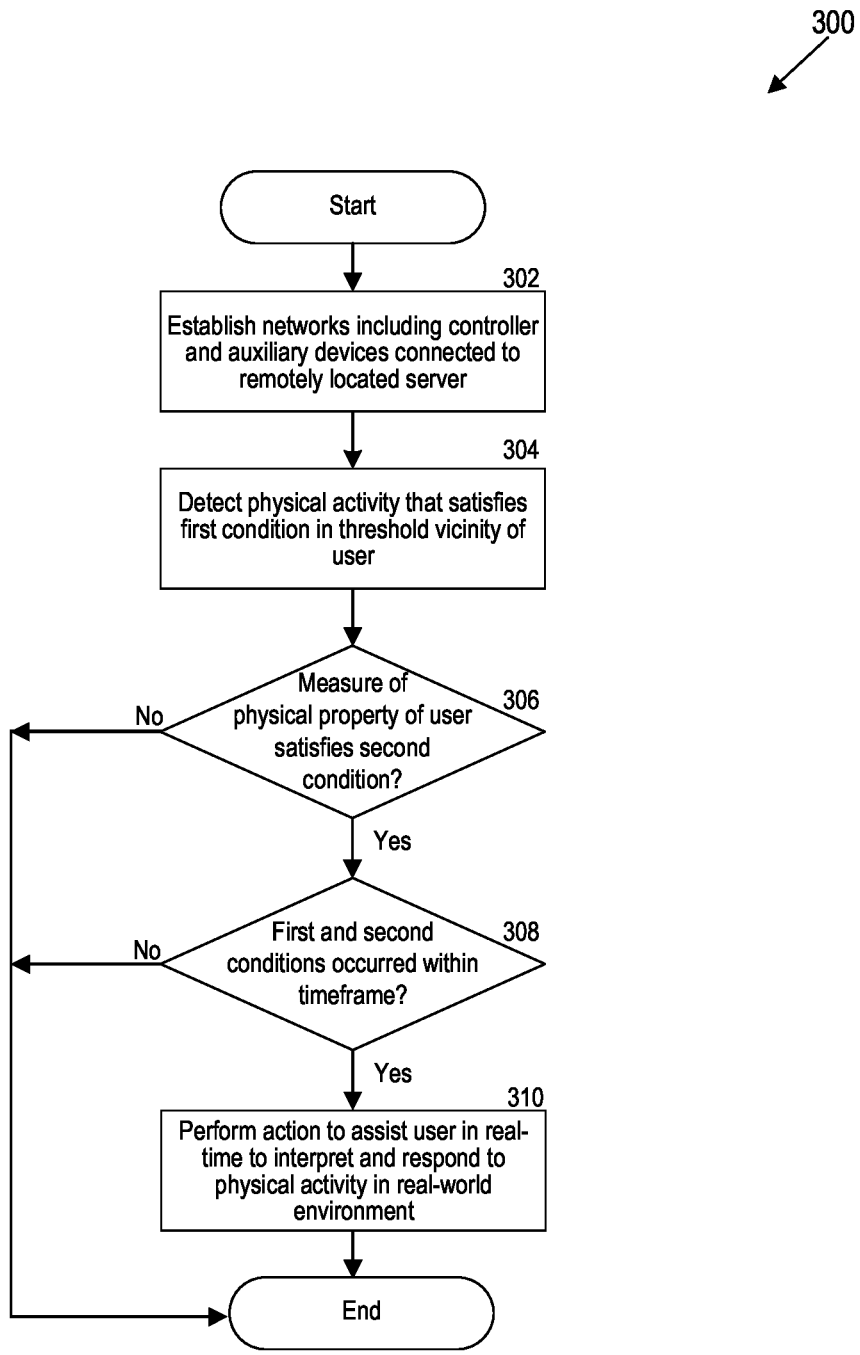
FIG. 3 is a flowchart that illustrates a process performed by a personal-assistance system for threat detection and convenience.

FIG. 3 is a flowchart that illustrates a process 300 performed by a personal assistance system ("system") for threat detection and convenience. As described with respect to FIG. 2, an example of the system includes multiple electronic components that are networked to assist a user in real-time to interpret and respond to physical activities in a real-world environment. The electronic components include a controller device that orchestrates signals received from multiple sensors distributed at the user and/or components that are located remote from the controller device. The controller device includes radios to communicate with a wearable device and with remote components, such as a server that includes a AI/ML engine that is used to improve performance of the system, to determine whether the user needs assistance to respond to a real-world scenario.

At 302, the system establishes one or more networks with the controller device (e.g., smartphone), auxiliary devices (e.g., wearables), and the remotely located server. As such, the controller has different radios that implement different protocols to connect over different networks (LAN, WAN, etc.). A network of sensors feed the controller device to detect physical activities in a threshold vicinity of the user and determine whether the user needs assistance based on a measure of a physical property of the user. The physical activities can include the presence of an object (e.g., person, vehicle, electronic device). The physical property can include a physical movement or physiological data (e.g., heartrate, eye movement). The threshold vicinity can be arbitrarily preset for a user based on a level of comfort, particular need or disability, or reach or limitation of the technology used for monitoring a vicinity of the user.

At 304, the system can detect that occurrence of a physical activity in the threshold vicinity satisfies a first condition. The system analyzes the physical activity, detects that the first condition is satisfied based on the analysis, and reports the detection of the first condition to a controller device. The first condition can be satisfied based on a location, type, or duration of the physical activity. The controller device can receive a signal from a sensor disposed on or near the user, or within a field-of-view that includes the user to detect physical activity in the vicinity. In one example, the system detects that a person is within the threshold vicinity for more than five seconds or detects an electronic device (e.g., kiosk) that is presenting audio, or a visualization directed to the user. Moreover, the system can detect that the audio/visual activity is at least partially incomprehensible by the user. For example, a sensor can detect that speech is in a language that is foreign to the user.

At 306, the system determines whether a measure of a physical property of the user satisfies a second condition. A sensor measures the physical property (e.g., heart rate, surface moisture, eye movement), detects that the second condition is satisfied based on the measurement, and reports the detection of the second condition to the controller device. The second condition can be satisfied based on a time, type, or duration of the physical property. The controller device can receive a signal from a sensor disposed to the controller device or an auxiliary device to determine that the measure of the physical property satisfies the second condition. If the second condition is not satisfied, the process ends because the user is probably aware of the possible risk or does not need assistance. In one example, the ML engine can predict whether the user needs assistance to interpret the human-perceptible information based on data included in a profile of the user, historical information of activities of multiple users of respective personal assistance systems, or content of the human-perceptible information.

At 308, the system determines whether the second condition was satisfied within a timeframe (e.g., period) in which the first condition occurred or was satisfied. In one example, the system determines that an object is detected within a threshold vicinity of the user at a first point in time. The system then determines, at a second point in time, a measure of a physical property of the user such as a movement or physiological property (e.g., heartrate) that satisfies a threshold value indicating that the user is unaware of the threat (e.g., an unchanged heartrate). As such, the system can notify the user about the physical activity. In another example, an accelerated heartrate is measured within a minute of when the object was detected, to notify authorities or a caregiver of the user about the potential threat.

The timeframe, first condition, second condition, or another value can be determined based on an output of an AI/ML engine that is trained based on values obtained from multiple users of respective systems including respective controller devices communicatively coupled to groups of auxiliary devices. If the second condition is not satisfied within the timeframe, the process 300 ends because the user is aware of the possible risk and/or does not need or would not benefit from assistance from the system. As such, the system will respond by forgoing to perform an action configured to assist the user in real-time to interpret and respond to the physical activity in the real-world environment. That is, despite physical activity being detected within a threshold vicinity of the user, the sensor data indicates that the user is aware of the physical activity and/or does not need assistance to interpret or respond to the physical activity.

At 310, the controller device causes the system to perform an action in response to the physical activity being in the threshold vicinity and a prediction that the user is unaware of the physical activity and/or would need/benefit from assistance. The action can include communicating a notification to a user device or an entity other than the user about a potential threat caused by the presence of the object within the threshold vicinity of the user. The system thus provides personal assistance when sensor data indicates that the user is unaware of a physical activity, or the physical activity presents a need for or benefit of assistance by the user to respond. Thus, the system can perform an action configured to assist the user in real-time to interpret and respond to the physical activity in a real-world environment. These functions can be performed by any combination of the controller device, auxiliary devices, and/or the server located at the network, which can feedback to the primary device to assist the user.

In one example, the controller device can create human-perceptible information based on detected physical activity in the vicinity of the user. The human-perceptible information is configured to assist the user to interpret the physical activity. The system is caused to present the new human-perceptible information to the user in real-time of detecting the physical activity. For example, the system can create an AR signal with visual elements that are incorporated into streaming media activity presented to the user by a kiosk in the vicinity of the user, where the AR experience is projected to the user through smart glasses.

The disclosed technology can include or use an edge computing architecture for mobile edge computing (MEC) or multi-access edge computing that provides execution resources (e.g., compute, storage) for applications with networking close to end user devices, within or at the boundary of operator networks. The edge infrastructure can be managed or hosted by communication service providers. As such, the disclosed technology is not bounded by resources in the immediate vicinity of the user and can benefit from low latency, high bandwidth, device processing and data offload, as well as trusted computing and storage.

For example, the user devices can offload processing and storage to edge computing components, which enable resource-intensive applications such as AI/ML, AR/VR, mixed reality, and metaverse technologies. That is, the edge computing architecture provides the distributed computing that brings computation and data storage closer to the sources of data (e.g., the user devices), which improves response times and saves bandwidth for threat detection and user assistance. In one example, the edge computing system can host applications and components on edge servers, resulting in edge computing services for real-time threat detection and personal assistance.

Computer System

Figure 4:
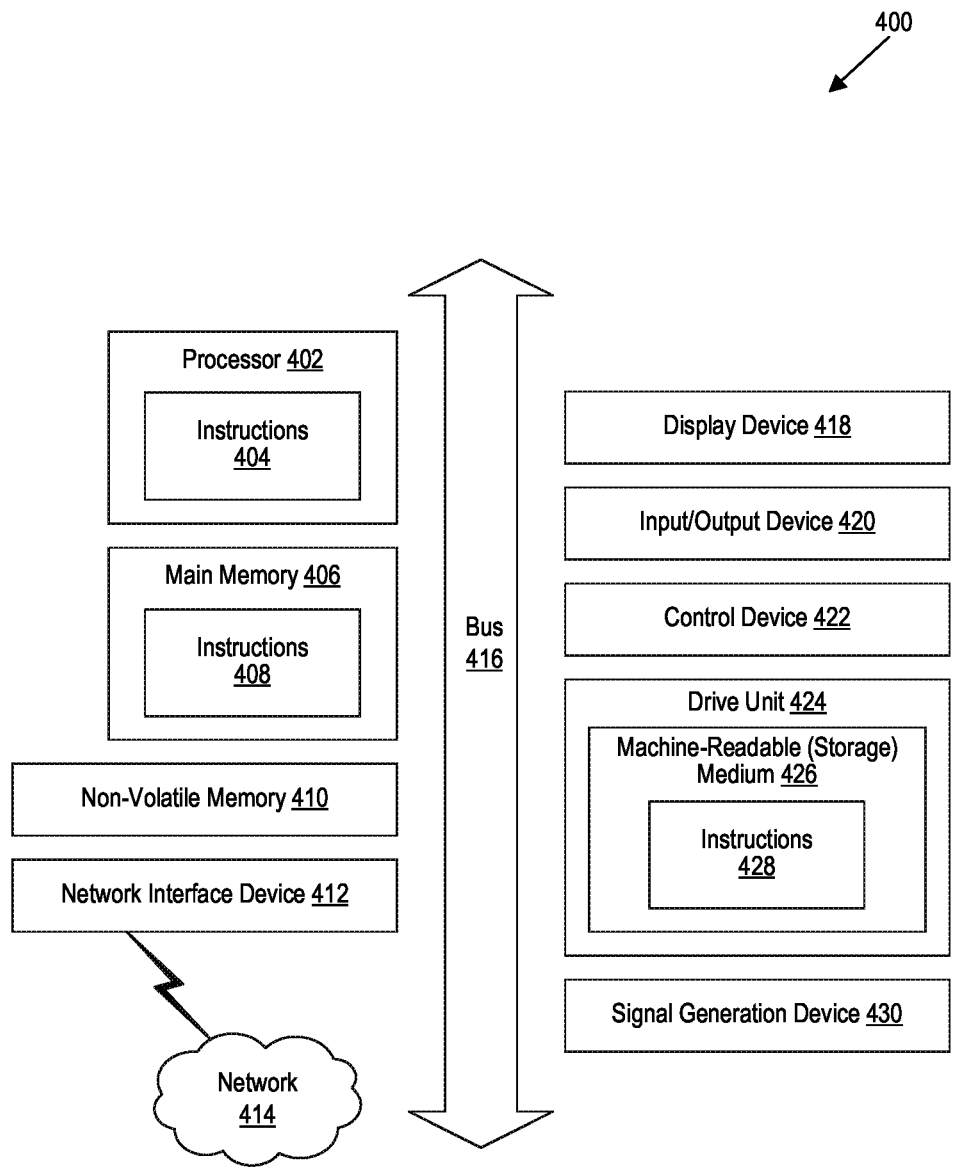
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A personal-assistance system comprising:
   a primary device configured to establish a local network with one or more secondary devices,
      wherein the primary device is configured to couple the system to a wireless telecommunications network, and
      wherein the one or more secondary devices includes at least one wearable device worn by a user;
   a first sensor configured to monitor physical activity occurring within a threshold vicinity of a user;
   a second sensor configured to measure a physical property of the user;
   at least one hardware processor; and
   at least one non-transitory memory storing instructions, which, when executed by the at least one hardware processor, cause the system to:
      determine that the physical activity satisfies a first condition,
         wherein the physical activity corresponds to detection of a presence of an object within a threshold vicinity of the user;
      determine that the measure of the physical property of the user satisfies a second condition,
         wherein the first condition and the second condition are satisfied within a timeframe; and
      in response to the first condition and the second condition being satisfied within the timeframe, predict that the user lacks awareness of the object being in the threshold vicinity of the user,
         wherein the measure of the physical property corresponds to a measure of a movement or physiological property of the user; and
      cause the primary device to generate an alert indicating the presence of the object within the threshold vicinity of the user,
         wherein the action is performed by the primary device and includes communicating the alert to an electronic device of the user and
         wherein the alert indicates that the presence of the object poses a risk of a threat to the user.

2. The system of claim 1 caused to:
   detect audio or visual activity associated with an object located within the threshold vicinity of the user,
      wherein the physical activity corresponds to the audio or visual activity associated with the object;
   detect that the audio or visual activity is at least partially incomprehensible by the user,
      wherein the measure of the physical property corresponds to a measure of a physical movement or physiological property of the user; and
   generate an audio element, tactile element, or a visual element configured to aid the user in comprehension of the audio or visual activity,
      wherein the action performed by the system includes presenting the audio element or the visual element to the user on an electronic device.

3. The system of claim 1 caused to:
   receive a first signal indicating that the physical activity satisfied the first condition;
   receive a second signal indicating that the second condition is not satisfied by the measure of the physical property of the user; and
   in response to the first signal and the second signal, forgo causing performance of the action configured to assist the user in real-time to interpret and respond to the physical activity in the real-world environment.

4. The system of claim 1:
   wherein the first sensor is disposed in a secondary device configured to determine a distance between the user and an object in the threshold vicinity of the user,
   wherein the first condition corresponds to a threshold distance between the user and the object,
   wherein the second sensor is disposed in a secondary device configured to predict awareness of the user that the object is in the threshold vicinity of the user, and
   wherein the measure of the physical property of the user includes a measure of heart activity, eye movement, physical movement, or speech of the user.

5. The system of claim 1:
   wherein the primary device is a handheld mobile device connected to the wireless telecommunications network, and
   wherein the one or more secondary devices include a wearable smart device communicatively coupled to the primary device over a short-range radio network.

6. The system of claim 1, wherein the first sensor is a hazard detection sensor comprising:
   a distance sensor configured to determine a distance to an object relative to the user,
   a motion sensor configured to detect motion of an object relative to the user,
   an audio sensor configured to detect sound or speech classified as hazardous, or
   a signal strength sensor configured to detect a signal strength of an electronic device.

7. The system of claim 1, wherein the timeframe, the first condition, or the second condition is determined based on an output of a machine learning (ML) model that is trained based on values obtained from multiple users of respective systems including respective primary devices communicatively coupled to secondary devices.

8. The system of claim 1 caused to:
update a local ML model at the primary device or a secondary device based on a global ML model stored at a remote server,
wherein the remote server is accessible via the wireless telecommunication network, and
wherein the global ML model is trained based on respective systems including primary devices coupled to secondary devices configured to assist multiple users.

9. The system of claim 1, wherein the primary device includes a cellular radio and a short-range wireless radio, the primary device being caused to:
use the cellular radio to couple the system to the wireless telecommunications network, and
use the short-range wireless radio to couple the one or more secondary devices to the wireless telecommunications network through the primary device,
wherein the primary device is a smartphone, a tablet computer, or another device that is subscribed to the wireless telecommunications network, and
wherein the one or more secondary devices includes an Internet-of-Things (IoT) device, a smart watch, smart glasses, or smart home device.

10. The system of claim 1 caused to:
configure the primary device to function as a network access point for a secondary device,
wherein the secondary device includes an Internet-of-Things (IoT) device, smartphone, tablet computer, wearable device, or smart home device.

11. The system of claim 1 further caused to:
analyze the physical activity in the threshold vicinity of the user;
detect that the first condition is satisfied based on the analysis of the physical activity,
wherein the first condition is indicative of an anomalous event;
report the detection of the first condition to the primary device; and
allow the system to perform the action only when the measure of the physical property satisfies the second condition.

12. A threat detection system comprising:
a handheld mobile device configured to communicatively couple with a wearable device worn by a user,
wherein the handheld mobile device is connected to a wireless telecommunications network;
a first sensor configured to detect whether an object is at or within a threshold distance of the user;
a second sensor configured to predict whether the user is aware that the object is at or within the threshold distance of the user; and
a controller configured to cause the threat detection system to perform an action in respond to the object being at or within the threshold distance of the user and a prediction that the user is unaware that the object is within the threshold distance of the user,
wherein the action includes communicating a notification to the user or an entity other than the user about a potential threat caused by presence of the object at or within the threshold distance of the user.

13. The threat detection system of claim 12:
wherein the first sensor is disposed in the handheld mobile device,
wherein the second sensor is disposed in the wearable device, and
wherein the action is performed by the handheld mobile device.

14. The threat detection system of claim 12:
wherein the first sensor is configured to detect presence of a person within the threshold distance of the user based on signal strength detected of an electronic device associated with the person or based on an imaging of the threshold distance of the user, and
wherein the second sensor is configured to predict whether the user is expecting to meet a person at a location based on a schedule or historic behavior of the user, or based on a measure of a physiological property of the user.

15. The threat detection system of claim 12:
wherein the first sensor is disposed in the handheld mobile device or the wearable device and configured to determine the distance between the user and an object in a vicinity of the user, and
wherein the second sensor is disposed in the handheld mobile device or the wearable device and configured to predict awareness of the object based on a pulse rate, heart activity, eye movement, physical movement, or speech of the user.

16. A system comprising:
a handheld mobile device configured to communicatively couple to a wearable device worn by a user,
wherein the handheld mobile device is connected to an edge computing component of a wireless telecommunications network;
a sensor configured to detect human-perceptible information from a third-party object within a threshold vicinity of the user;
a machine learning (ML) engine configured to predict whether the user needs assistance to interpret the human-perceptible information of the object,
wherein a capability of the ML engine is augmented by the edge computing component to increase processing or storage capabilities of the handheld mobile device for interpreting the human-perceptible information of the object;
a controller configured to create new human-perceptible information based on the human-perceptible information,
wherein the new human-perceptible information is generated in part based on an output of the ML engine augmented by the edge computing component, and
wherein the new human-perceptible information is configured to assist the user to interpret the human-perceptible information; and
cause the system to present the new human-perceptible information to the user, wherein the new human-perceptible information is presented in real-time or near-real-time of detecting the human-perceptible information.

17. The system of claim 16, wherein the human-perceptible information includes a visualization, and wherein to create the new human-perceptible information comprises causing the system to:
incorporate a virtual element into the visualization to generate an augmented-reality (AR) visualization configured by the edge computing component to assist the user to interpret the human-perceptible information.

18. The system of claim 16, wherein the human-perceptible information includes speech in a first language, and wherein to create the new human-perceptible information comprises causing the system to:

translate the speech in a second language different from the first language to assist the user to interpret the human-perceptible information.

19. The system of claim 16, wherein the ML engine is configured to predict whether the user needs assistance to interpret the human-perceptible information based on:
- a profile of the user,
- historical information of activities of multiple users of respective systems, or
- content of the human-perceptible information.

* * * * *